United States Patent Office 3,496,220
Patented Feb. 17, 1970

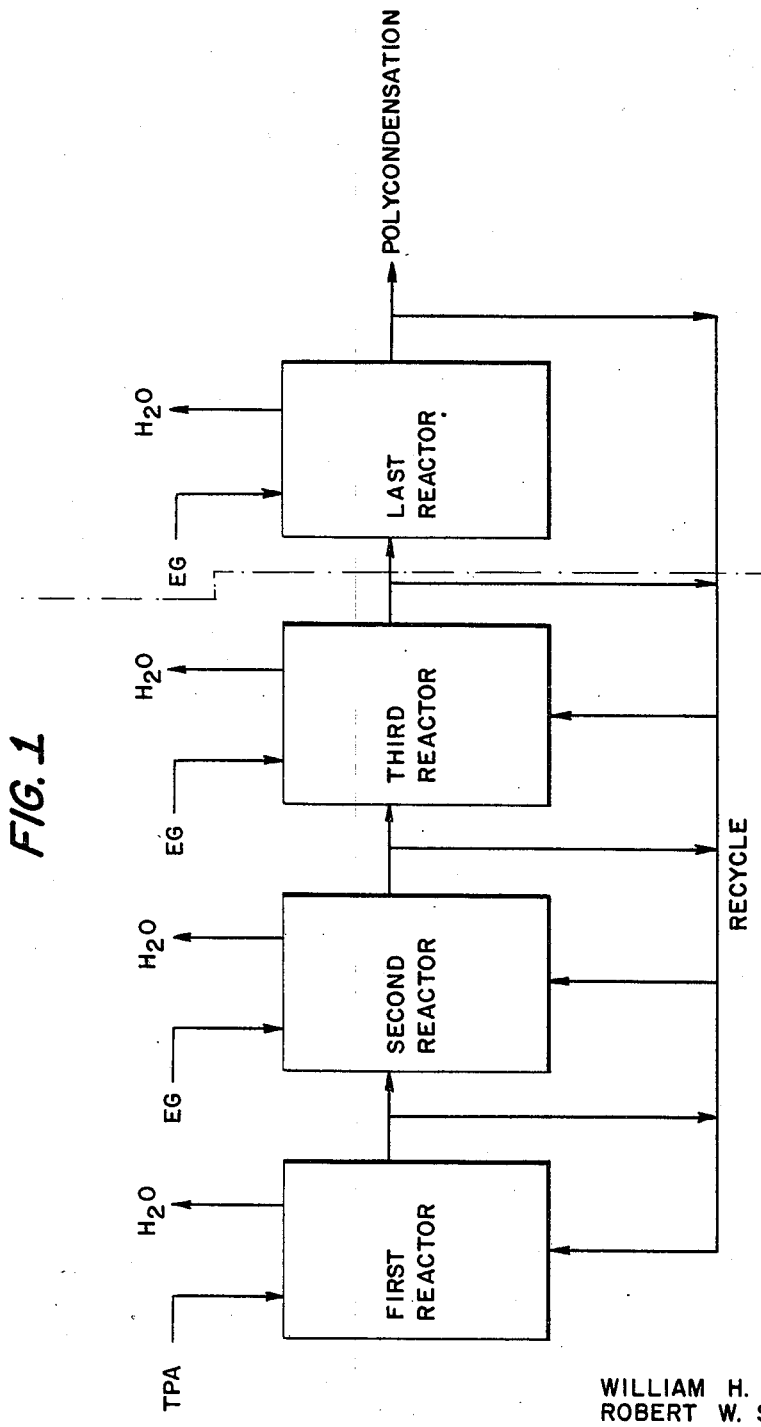

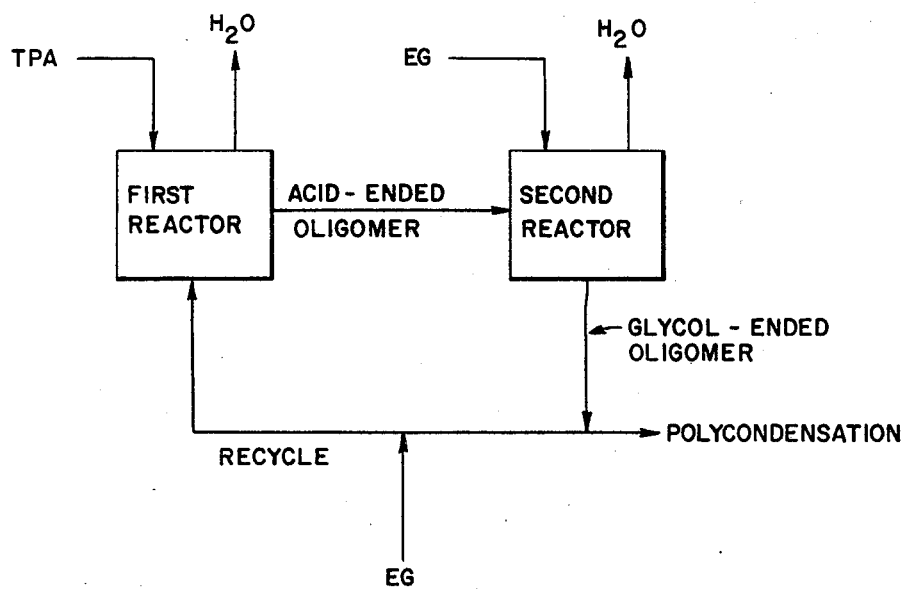
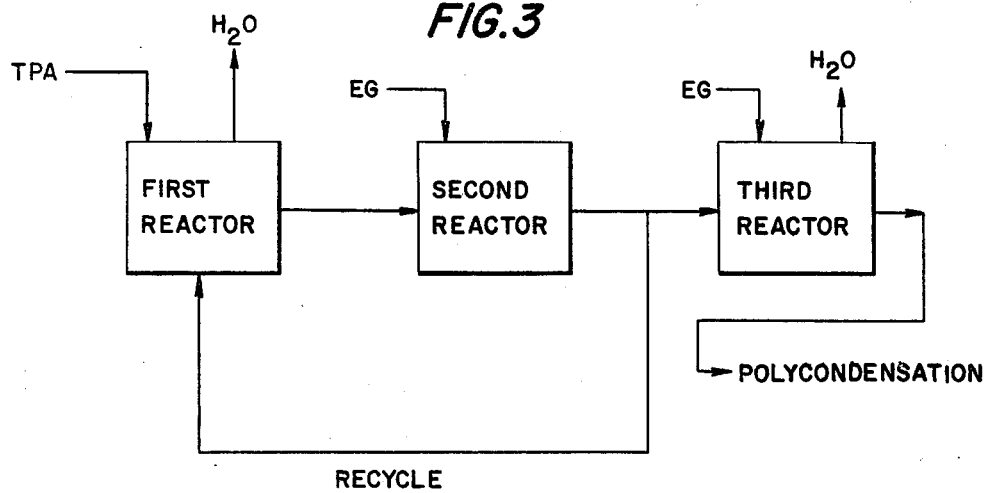

3,496,220
ESTERIFICATION PROCESS
William H. McCarty, Bridgewater Township, Somerset County, Harry R. Nettleton, Basking Ridge, and Robert W. Stevenson, Edison, N.J., assignors to Mobil Oil Corporation, a corporation of New York
Continuation-in-part of application Ser. No. 540,072, Apr. 4, 1966. This application Oct. 28, 1966, Ser No. 590,338
Int. Cl. C07c *69/82;* C08g *17/04*
U.S. Cl. 260—475
10 Claims

ABSTRACT OF THE DISCLOSURE

Hydroxyl-ended oligomer suitable for polycondensation to high molecular weight linear polyesters is prepared by reacting a diacid with preformed molten hydroxyl-ended oligomer in a first zone, which may be at from substantially sub-atmosperic to substantially autogenous pressure, at a temperature between 220–320° C., to form a carboxyl-ended oligomer, and reacting the resultant carboxyl-ended oligomer with a glycol in successive reaction zones at a temperature between 180–320° C. and at a pressure between the autogenous pressure present in each reaction zone and sub-atmosperic pressure to form hydroxyl-ended oligomer.

---

This application is a continuation-in-part of our application Ser. No. 540,072, filed Apr. 4, 1966, now abandoned.

This invention relates to the preparation of linear polyesters. In one specific aspect, it relates to the preparation of an oligomeric product suitable for polymerization to high molecular weight linear polyesters.

In preparing linear polyesters such as polyethylene terephthalate, a prepolymer consisting of bis-(hydroxyethyl) terephthalate and/or higher ethylene terephthalate oligomers is polycondensed under vacuum removing the glycol liberated as the prepolymer undergoes progressive polycondensation. The reactant prepolymer is usually prepared by the transesterification of dimethyl terephthalate with ethylene glycol.

Such prepolymers may also be prepared by the direct esterification of highly purified terephthalic acid with excess ethylene glycol at the normal boiling point of the glycol. The rate of esterification is very slow and, because of an increase in diglycol by-product formation, the direct esterification approach has yielded a less desirable product than that obtained by transesterification. The diglycol ether by-product becomes incorporated into the polyester chain lowering its melting point and generally adversely affecting other properties of the resultant polymer.

The use of a low glycol to acid ratio has been found to reduce the amount of ether by-product formed during direct esterification, and the addition of inorganic alkalis, various salts and other materials has been found to further inhibit ether formation. Heating of the system under pressure at tempeartures above the normal boiling point of the glycol has been discovered to lower the time required for esterification.

Combining terephthalic acid in the particle size range of commerce with small amounts of ethylene glycol presents a mixing problem. Special mixing methods or the use of a diluent such as water or an aromatic hydrocarbon have been employed to overcome this problem. More recently, it has been found that polyethylene terephthalate prepolymer may be employed as the reaction medium for the direct esterification of terephthalic acid with a glycol.

The present invention is a novel method for esterifying a diacid with a glycol to produce an oligomeric product suitable for polycondensation to a high molecular weight linear polyester. The invention is based on the discovery that improved results are obtained when the esterification reaction is effected in multiple steps, or is accomplished in multiple reaction zones. Broadly speaking, the acid is reacted with preformed and molten hydroxyl-ended oligomer in a first step or zone to produce a carboxyl-ended oligomer. The carboxyl-ended oligomer is reacted with a glycol in successive steps or zones to form hydroxyl-ended oligomer having a low ether content and suitable for polycondensation to high molecular weight linear polyester. The material produced in any step or zone can be recycled to any preceding step or zone. The hydroxyl-ended oligomer produced in the last step or zone is generally subjected to a final flash to remove any unreacted glycol prior to polycondensation.

It is, therefore, an object of the present invention to provide a novel and improved method for the esterification of a diacid with a glycol to make oligomer suitable for polycondensation to high molecular weight linear polyester.

It is a further object of the invention to provide a method which produces oligomer of low ether content.

It is still another object of the present invention to provide a method which does not require the use of special mixing techniques or the addition of catalysts, buffers, inhibitors, or the like.

Accordingly, the present invention is a method for the preparation of hydroxyl-ended oligomer suitable for polycondensation to high molecular weight linear polyesters which comprises reacting a diacid with preformed molten hydroxyl-ended oligomer in a first zone, which may be at from substantially sub-atmospheric to autogenous pressure, at a temperature between 220–320° C., to form a carboxyl-ended oligomer, reacting the resultant carboxyl-ended oligomer with a glycol in one or more successive zones at a temperature between 180–320° C. and at a pressure between the autogenous pressure present in each successive reaction zone and sub-atmosperic pressure to form hydroxyl-ended oligomer and, if desired, returning a portion of the oligomer formed in any of the successive zones to any preceding zone.

Our invention is further illustrated by means of the following discussion and examples and accompanying drawings in which:

FIGURE 1 is a flowsheet schematically illustrating the generic invention, and

FIGURES 2 and 3 are flowsheets schematically illustrating specific embodiments of the invention.

Although the present invention is illustrated by means of embodiments utilizing the reaction of terephthalic acid with ethylene glycol, our invention relates generally to the esterification of a dicarboxylic acid with a glycol. Diacids such as succinic, pimelic, adipic, cyclohexane dicarboxylic, diphenyl dicarboxylic, isophthalic, et cetera, can be esterified with polymethylene glycols such as propylene glycol, butanediol, decamethylene glycol and the like.

Referring to FIGURE 1, terephthalic acid acid (TPA) is added to the first reactor for reaction with hydroxyl-ended oligomer contained therein. The hydroxyl-ended oligomer may be from any convenient source but is preferably obtained by recycle of the oligomer produced in one or more of the subsequent reactors. Carboxyl-ended oligomer from the first reactor is passed to the second reactor for reaction with ethylene glycol (EG). As shown, the oligomer then passes from the second reactor to the third reactor and successively through the further reactors present until it reaches the last reactor. There is no theoretical upper limit to the number of reactors that may be present in the system. Each of the reactors is provided with means for the removal of water ($H_2O$) but it is not necessary that any or all of the water of esterification formed be removed from a given reactor. Under some conditions, it may be desirable to feed water to a reactor. Each reactor subsequent to the first is provided with means for adding ethylene glycol and for recycling the oligomer produced therein to any preceding reactor. Preferably about one-third to three-quarters of the oligomer is recycled. The ratio of unreacted alcohol groups to unreacted acid groups in the oligomer product from the first reactor is generally less than 1.0. The ratio increases stepwise as further glycol is added as the oligomer passes from reactor to reactor. The final ratio prior to polycondensation must exceed 1.0 and is generally 3–5 or more.

A more specific embodiment of the invention is illustrated in FIGURE 2. Terephthalic acid (TPA) and hydroxyl-ended oligomer from the second reactor are passed into the first reactor. Water of esterification distills out gomer is passed to the second reactor. Ethylene gycol (EG) is added to the oligomer in the second reactor and lesser amounts of water of esterification are distilled out. The hydroxyl-ended oligomer is removed and the exit stream split with a portion being sent forward for polycondensation and a portion being returned to the first reactor for reaction with terephthalic acid. The amount of glycol added in the second zone is roughly equivalent to the amount of acid added in the first zone. Minor adjustment in the theoretical 1:1 molar ratio may be made to compensate for glycol lost by evaporation, the presence of small amounts of unreacted diacid or glycol in either reaction zone, by-product formation, and the like. An excess of glycol is often provided and is later removed in the subsequent polycondensation procedure. It may also be desirable to blend in glycol with the stream of oligomer being recycled to the first zone.

FIGURE 3 describes a specific embodiment of the invention wherein three reactors are employed. Terephthalic acid (TPA) and mixed carboxyl-ended and hydroxyl-ended oligomer from the second reactor are passed into the first reactor which contains a heel of hydroxyl-ended oligomer. The carboxyl-ended oligomer from the first reactor is passed to the second reactor and ethylene glycol is added; no water of esterification is removed. Mixed carboxyl-ended and hydroxyl-ended oligomer is removed from the second reactor and the exit stream split with a portion being returned to the first reactor for reaction with terephthalic acid and a portion being sent forward to the third reactor for reaction with additional glycol. The oligomer product from the third reactor, after flashing to remove unreacted glycol, is used for polycondensation.

In the specific embodiments discussed above, each reactor represents a reaction step or reaction zone. Each reaction zone may be divided into further reaction zones by providing for the intermittent or progressive addition of glycol or removal of water. And each reactor, by appropriate change in reaction conditions, may be utilized for more than one reaction step or reaction zone.

The overall process of our invention may be accomplished batchwise, or as a cyclic or a continuous process. The reaction temperature in the first zone is between 220–320° C. and preferably 240–285° C.; that in the second and subsequent zones is between 180–320° C. and preferably 200–280° C. and is usually slightly below that in the first zone. Although the process can be suitably carried out at atmospheric pressure and below in the first zone, higher pressures may be used such as under autogenous pressures and, in the second or subsequent zones, the pressure can also be varied from autogenous to atmospheric pressure and below. Autogenous pressure, as used herein, is a function of the vapor pressures of the materials present in the particular zone and is the pressure generated if no volatile reactant or product is removed from the reaction zone.

Our invention is further illustrated by means of the following examples wherein Examples 1, 2 and 3 illustrate a process in which half of the hydroxyl-ended oligomer product from the second zone is returned to the first zone; more is returned in the processes of Examples 5, 6 and 8. Examples 6 and 8 also illustrate a process involving intermittent addition of glycol to the second reaction zone. Example 9 illustrates a process such as shown in FIGURE 3. The hydroxyl-ended oligomer product from each of these examples in suitable for conversion to high moleclular weight polyethylene terephthalate in the usual way as illustrated in Example 7. Dry deoxygenated nitrogen was used in all of the experiments described.

Example 1

Nitrogen was passed through molten bis(hydroxyethyl) terephthalate at 220–320° C. Ninety grams of the resultant hydroxyl-ended oligomer having an ether content of 0.8% was reacted with 67.1 grams of terephthalic acid for 4.5 hours at 224° C. and at atmospheric pressure while passing nitrogen through the stirred reaction mixture. The ether content of the product was 1.2% of the total glycol units present, and the fraction of acid units present as ester was 0.63.

One hundred grams of the carboxyl-ended oligomer was reacted with 25.05 grams of glycol in a turbine stirrer-equipped autoclave at 240° C. for 2 hours at an autogenous pressure of 114 p.s.i.g., including inert gas blanket. The autoclave was vented and a slow stream of nitrogen passed through for 4 minutes before quenching the reaction. The ether content of the product was 2.1% of the total glycol units present, and the fraction of acid units present as ester was 0.84.

Example 2

A run similar to that described in Example 1, except that the residence time in the autoclave was 30 minutes rather than 2 hours, gave a second zone product containing only 1.5% ether.

Example 3

A run similar to that described in Example 1, except that the reaction temperature in the first zone was 244° C. gave a first zone product having an ether content of 1.8%, and the fraction of acid units present as ester was 0.68. The second zone product had an ether content of 2.8%, and the fraction of acid units present as ester was 0.92.

Example 4

For comparison purposes, 42 grams of glycol and 75 grams terephthalic acid were thoroughly mixed and charged in the cold to a 300 cc. stainless steel autoclave equipped with a turbine stirrer. The autoclave was purged with nitrogen and heated to 240° C. The pressure gradually increased over a period of 40 minutes from 34 to 105 p.s.i.g. and was maintained at that pressure for one hour before being slowly released to atmospheric pressure over a period of 45 minutes. The product had an acid number of 1318 equivalents/$10^6$ g. of product and a saponification number of 9402 equivalents/$10^6$ g. of product. These values indicate that an 0.86 fraction of the acid units was present as ester, and the ether content was 4.7% of the total glycol units.

Example 5

This run is similar to that described in Example 1 except that 60% of the hydroxyl-ended oligomer was returned to the first zone. The overall proportions by weight of reactants employed was as follows:

Acid charged to first zone _____ 1.000
Glycol charged to second zone _____ 0.562
Effluent from first zone _____ 2.857
Effluent from second zone _____ 3.365
Recycle (60% of second zone effluent) _____ 2.020

Sixty grams of ethylene terephthalate prepolymer characterized by a saponification number of 8876 equivalents/

$10^6$ g., and an ether content of 1.9% was heated to 280° C. with 29.7 grams of terephthalic acid for thirty minutes. Using a pressurized tube, 16.69 grams of ethylene glycol was added to the first zone product and the reactants maintained at 260° C. and at autogenous pressure for 25 minutes. The autoclave was then vented and held at atmospheric pressure under a stream of nitrogen for four minutes.

In the second cycle, 60% of the product of the first cycle was reacted successively with 29.70 grams of terephthalic acid and 16.69 grams of ethylene glycol in a manner identical to that described above for the first cycle. This sequence was repeated for 35 cycles varying reaction conditions as indicated and with the results as tabulated below:

and heated in a 300 cc. turbine-stirred autoclave to 280° C. and maintained at this temperature for one hour. To the acid-ended oligomer product of the first step there was added 13.57 grams of ethylene glycol. After reaction for 20 minutes at 260° C. and at autogenous pressure, the system was vented and held at atmospheric pressure for 15 minutes under a slow stream of nitrogen.

Seventy percent of the first cycle product was reacted with terephthalic acid and with glycol in two steps exactly as described above. The sequence was continued except that the mode of glycol addition and residence time in the second zone were varied after four cycles had been completed. The reaction conditions employed and the results obtained are tabulated below:

| | Reaction conditions | | | Second zone product | | | |
|---|---|---|---|---|---|---|---|
| Cycle | Min. in first zone | Min. in second zone | Min. autogeneous pressure second zone | Percent of total glycol as diethylene glycol | Sap. No., eq/$10^6$ g. | Acid No., eq/$10^6$ g. | Percent acid units present as estes |
| 1 | 30 | 260 | 25 | 1.9 | 9,311 | 644 | 93 |
| 2 | 30 | 260 | 25 | 1.9 | 9,461 | 866 | 91 |
| 3 | 30 | 260 | 25 | 1.6 | 9,413 | 1,080 | 89 |
| 4 | 30 | 260 | 25 | 1.9 | 9,415 | 803 | 92 |
| 5 | 30 | 260 | 10 | 1.9 | 9,433 | 1,273 | 87 |
| 6 | 30 | 260 | 10 | 1.9 | 9,329 | 1,797 | 81 |
| 7 | 30 | 260 | 10 | 2.0 | 9,248 | 1,756 | 81 |
| 8 | 30 | 260 | 10 | 1.9 | 9,391 | 1,357 | 86 |
| 9 | 30 | 240 | 10 | 1.6 | 9,356 | 1,977 | 79 |
| 10 | 30 | 240 | 10 | 1.6 | 9,310 | 1,937 | 79 |
| 11 | 30 | 240 | 10 | 1.9 | 9,314 | 2,094 | 78 |
| 12 | 30 | 240 | 10 | 1.5 | 9,301 | 1,731 | 81 |
| 13 | 30 | 240 | 25 | 2.0 | 9,234 | 1,693 | 82 |
| 14 | 30 | 240 | 25 | 1.8 | 9,306 | 1,324 | 86 |
| 15 | 30 | 240 | 25 | 1.6 | 9,232 | 1,390 | 85 |
| 16 | 30 | 240 | 25 | 1.6 | 9,469 | 1,540 | 84 |
| 17 | 60 | 240 | 25 | 1.5 | 9,448 | 1,577 | 83 |
| 18 | 60 | 240 | 25 | 1.5 | 9,402 | 1,726 | 82 |
| 19 | 60 | 240 | 25 | 1.1 | 9,393 | 1,652 | 82 |
| 20 | 60 | 240 | 25 | 1.5 | 9,294 | 1,884 | 80 |
| 21 | 30 | 260 | 40 | 1.8 | 9,444 | 1,046 | 89 |
| 22 | 30 | 260 | 40 | 2.0 | 9,311 | 1,053 | 89 |
| 23 | 30 | 260 | 40 | 2.3 | 9,403 | 969 | 90 |
| 24 | 30 | 260 | 40 | 2.0 | 9,406 | 1,014 | 89 |
| 25 | 30 | 260 | 40 | 1.8 | 9,419 | 912 | 90 |
| 26 [1] | 30 | 260 | 40 | 1.8 | 9,513 | 864 | 91 |
| 27 [1] | 30 | 260 | 40 | 1.7 | 9,365 | 1,106 | 88 |
| 28 [1] | 30 | 260 | 40 | 1.7 | 9,398 | 1,049 | 89 |
| 29 | 30 | 260 | 25 | 1.7 | 9,687 | 992 | 90 |
| 30 | 30 | 280 | 25 | 1.7 | 9,757 | 1,221 | 88 |
| 31 | 30 | 280 | 25 | 1.6 | 9,697 | 1,213 | 88 |
| 32 | 30 | 280 | 25 | 2.0 | 9,710 | 777 | 92 |
| 33 | 60 | 260 | [2] 40 | 1.7 | 9,747 | 657 | 93 |
| 34 | 60 | 260 | [2] 40 | 1.5 | 9,971 | 347 | 97 |
| 35 | 60 | 260 | [2] 40 | 1.6 | 9,714 | 360 | 96 |
| 36 | 60 | 260 | [2] 40 | 1.5 | 9,720 | 395 | 96 |

[1] 0.083 g. of diisopropylamine was added with the glycol.
[2] Half of the glycol charge was added initially and half after 20 minutes at autogenous pressure; time at atmospheric pressure was extended to 15 minutes.

Example 6

This experiment is similar to that described in Example 5 except that 70% hydroxyl-ended oligomer was returned to the first zone. The overall proportions by weight of the reactants employed was as follows:

Acid charged to first zone _____ 1.000
Glycol charged to second zone _____ 0.560
Effluent from first zone _____ 4.007
Effluent from second zone _____ 4.477
Recycle (70% of second zone effluent) _____ 3.134

A prepolymer product characterized by a saponification number of 9746 eq./$10^6$ g., an acid number of 233 eq./$10^6$ g., and an ether content of 2.0% of the glycol units was employed in this run. The prepolymer (69.3 grams) was mixed with 24.2 grams of terephthalic acid

| | Second zone conditions | | | Second zone product | |
|---|---|---|---|---|---|
| Cycle No. | Temp., °C. | Time at autogenous pressure | Time at atmospheric pressure | Percent of total acid units present as ester | Diethylene glycol, percent of total glycol units |
| 1 | 260 | 20 | 15 | 87 | 1.7 |
| 2 | 260 | 20 | 15 | 96 | 1.6 |
| 3 | 260 | 20 | 15 | 96 | 1.2 |
| 4 | 260 | 20 | 15 | 95 | 1.4 |
| 5 | 260 | [2] 30 | 15 | 96 | 1.4 |
| 6 | 260 | [2] 30 | 15 | 96 | 1.3 |
| 7 | 260 | [2] 30 | 15 | 95 | 1.3 |
| 8 | 260 | [2] 30 | 15 | 93 | 1.2 |
| 9 [1] | 260 | [2] 30 | 15 | 93 | 1.3 |
| 10 [1] | 260 | [2] 30 | 15 | 95 | 1.3 |
| 11 [1] | 260 | [2] 30 | 15 | 90 | 1.2 |
| 12 [1] | 260 | [2] 30 | 15 | 90 | 1.1 |

[1] First zone residence time at 280° C. was increased to two hours.
[2] Glycol was added in 3 equal increments at 10 minute intervals; the reaction was vented to atmospheric pressure prior to each additional and run autogenously between additions.

Example 7

A 55 gram blend of the unrecycled portion of the prepolymer from cycles 6 through 8 in Example 6 was prepared. Antimony trioxide (0.025% by weight) was added and the mixture heated to 285° C. while being swept with nitrogen. At 285° C., the pressure was reduced to 1.0 mm. during five minutes, and to 0.05 mm. over the next 30 minutes. After three hours under vacuum, the heating and evacuation were discontinued and the polymer product quenched in liquid nitrogen. The polymer had an ether content of 1.2%, a melting point of 265–266° C., and an intrinsic viscosity of 0.89 in phenol-tetrachloroethane (1:1 by weight).

Example 8

The series of Example 6 was continued using a pressure equalizing device so that the glycol was added to the reaction mixture without changing the pressure in the reaction system. The reaction time in the first zone was 2 hours at 280° C. and at atmospheric pressure. The second zone temperature was 260° C., the second zone reaction time was 30 minutes under autogenous pressure and 15 minutes at atmospheric pressure. The glycol was added in three equal portions at ten minute intervals with the autoclave vented to atmospheric pressure and resealed prior to the second and third additions. The pressures employed and the properties of the products obtained are given in the following table:

| Cycle | Minimum pressure in second zone, p.s.i.g. | Second zone product | |
|---|---|---|---|
| | | Percent of total acid units present as ester | Diethylene glycol, percent of total glycol units |
| 13 | 15 | 82 | 1.0 |
| 14 | 28 | 90 | 1.1 |
| 15 | 25 | 91 | 1.1 |
| 16 | 21 | 90 | 1.0 |

Example 9

Hydroxyl-ended starting oligomer for the first reactor was prepared starting with 112.38 grams of a blend of prepolymers having over 90% of the acid reacted and containing less than 2% of ether. The prepolymer blend was reacted with 46.36 grams of terephthalic acid at 260° C. and then with 4.94 grams of ethylene glycol for 20 minutes at autogenous pressure. The resultant oligomer had a saponification number of 9935 eq./$10^6$ g., an acid number of 3456 eq./$10^6$ g., and an ether content of 1.1%.

The reaction sequence was as follows: 12.50 grams of terephthalic acid was reacted with 112.38 grams of the resultant oligomer prepared as described in the preceding paragraph by heating at 260° C. and at atmospheric pressure for 20 minutes. The acid-ended oligomer was then reacted with 3.75 grams of ethylene glycol at 260° C. at autogenous pressure for 20 minutes. After venting, 88.9% of the oligomer material obtained was reacted sequentially with 12.50 grams of terephthalic acid and 3.75 grams of ethylene glycol as before, and the procedure was repeated until nine cycles had been completed. The resultant oligomer had 58% of the total acid groups present as ester and had an ether content of 1.3%.

In the final step, 80 grams of the oligomer prepared as described in the preceding paragraph was reacted with 19.52 grams of ethylene glycol at 260° C. and at autogenous pressure for 20 minutes and at the same temperature under atmospheric pressure for 15 minutes. The oligomer product had a saponification number of 8876 eq./$10^8$ g. and an acid number of 136 eq./$10^6$ g.; 99% of the total acid was present as ester and the ether content was 2.2%.

The proportions of reactants added and products obtained is summarized in the following table:

| | Equivalents | Grams |
|---|---|---|
| Diacid to first step | 0.01205 | 1 |
| Water from first step | 0.008569 | 0.1544 |
| Oligomer from first step | 0.10844 | 10.007 |
| Glycol to second step | 0.00964 | 0.2992 |
| Oligomer from second step | 0.11808 | 10.305 |
| Oligomer recycled from second to first step | 0.10496 | 9.159 |
| Oligomer to third step | 0.01312 | 1.145 |
| Glycol to third step | 0.008439 | 0.2619 |
| Water from third step and final flashing | 0.00348 | 0.0627 |
| Oligomer product | 0.01808 | |

The above-offered non-limiting examples are given for the purpose of illustrating specific embodiments of the invention. Other variations falling within the scope of the present invention will become apparent to those skilled in the art. The invention is as claimed.

We claim:

1. A method for the preparation of hydroxyl-ended oligomer of terephthalic acid and a glycol suitable for polycondensation to high molecular weight linear polyesters which comprises reacting terephthalic acid with preformed molten hydroxyl-ended oligomer in a first zone, which may be at from substantially sub-atmospheric to substantially autogenous pressure, at a temperature between 220–320° C., to form a carboxyl-ended oligomer, reacting the resultant carboxyl-ended oligomer with a glycol in successive reaction zones at a temperature between 180–320° C. and at a pressure between the autogenous pressure present in each reaction zone and sub-atmospheric pressure to form hydroxyl-ended oligomer.

2. A method according to claim 1 wherein the glycol is ethylene glycol.

3. A method according to claim 1 wherein a portion of the oligomer formed in any of the said successive reaction zones is returned to a preceding reaction zone.

4. A method for the preparation of hydroxyl-ended oligomer of terephthalic acid and a glycol suitable for polycondensation to high molecular weight linear polyesters which comprises reacting terephthalic acid with preformed molter hydroxyl-ended oligomer in a first zone substantially at a pressure of from less than atmospheric to autogenous pressure at a temperature between 220–320° C. to form a carboxyl-ended oligomer, reacting the resultant carboxyl-ended oligomer with a glycol in a second zone at a temperature between 180–320° C. and at a pressure between the autogenous pressure present in the second zone and sub-atmosphric pressure to form hydroxyl-ended oligomer.

5. A method according to a claim 4 wherein the glycol is ethylene glycol.

6. A method according to claim 4 wherein a portion of the hydroxyl-ended oligomer formed in the second zone is retwined to the first zone as the hydroxyl-ended oligomer for reaction with the terephthalic acid.

7. A method for the preparation of hydroxyl-ended oligomer of terephthalic acid and a glycol suitable for polycondensation to high molecular weight linear polyethylene terephthalate which comprises reacting terephthalic acid with preformed molten hydroxyl-ended oligomer in a first zone substantially at atmospheric pressure and at a temperature between 240–320° C. to form a carboxyl-ended oligomer reacting the resultant carboxyl-ended oligomer with ethylene glycol in a second zone at a temperature between 200–320° C. and at a pressure between the autogenous pressure present in the second zone and atmospheric pressure to form hydroxyl-ended oligomer, and returning a portion of the hydroxyl-ended oligomer formed in the second zone to the first zone for reaction with the terephthalic acid.

8. A method for the preparation of hydroxyl-ended oligomer of terephthalic acid and a glycol suitable for polycondensation to high molecular weight linear polyesters which comprises reacting terephthalic acid with preformed molten hydroxyl-ended oligomer in a first zone substantially at a pressure of from sub-atmospheric to autogenous pressure at a temprature between 220–320° C. to form a carboxyl-ended oligomer, reacting the resultant carboxyl-ended oligomer with a glycol in a second zone at a temperature between 180–320° C. and at autogenous pressure to form mixed carboxyl-ended and hydroxyl-ended oligomer returning a portion of the mixed oligomer from the second zone to the first zone for reaction with terephthalic acid, and reacting the remainder of the mixed oligomer from the second zone with further glycol to form hydroxyl-ended oligomer suitable for the said polycondensation.

9. A method according to claim 8 wherein the glycol is ethylene glycol.

10. A method according to claim 8 wherein the reaction in the first zone is carried out at substantially atmospheric pressure.

References Cited

UNITED STATES PATENTS 3,050,533   8/1962   Munro et al. _____ 260—346.1

FOREIGN PATENTS 776,282   6/1957   Great Britain.

LORRAINE A. WEINBERGER, Primary Examiner

E. JANE SKELLY, Assistant Examiner

U.S. Cl. X.R.

260—75, 468, 485

PO-1050
(5/b3)

UNITED STATES PATENT OFFICE
CERTIFICATE OF CORRECTION

Patent No. 3,496,220   Dated February 17, 1970

Inventor(s) William H. McCarty, Harry R. Nettleton, and Robert W. Stevenson

It is certified that error appears in the above-identified patent and that said Letters Patent are hereby corrected as shown below:

Column 1, line 59, "tempeartures" should be read --temperatures--.
Column 3, lines 17-18, "distills out gomer" should be read --distills out of the first reactor and the resultant carboxyl-ended oligomer--.
Column 5, line 6 of Table, in last column heading "estes" should be read --ester--.
Column 5, line 31 of Table, "Cycle 25" should bear the symbol --1-- to indicate that Note 1 applies to this cycle.
Column 8, line 54, "retwined" should be read --returned--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents